United States Patent
Yoon et al.

(10) Patent No.: US 8,050,326 B2
(45) Date of Patent: Nov. 1, 2011

(54) METHOD FOR PROVIDING AND USING INFORMATION ABOUT INTER-LAYER PREDICTION FOR VIDEO SIGNAL

(75) Inventors: Doe Hyun Yoon, Seoul (KR); Ji Ho Park, Seoul (KR); Seung Wook Park, Seoul (KR); Byeong Moon Jeon, Seoul (KR)

(73) Assignee: LG Electronics Inc., Seoul (KR)

( * ) Notice: Subject to any disclaimer, the term of this patent is extended or adjusted under 35 U.S.C. 154(b) by 66 days.

(21) Appl. No.: 11/914,949

(22) PCT Filed: May 25, 2006

(86) PCT No.: PCT/KR2006/001980
§ 371 (c)(1),
(2), (4) Date: Jul. 8, 2009

(87) PCT Pub. No.: WO2006/126841
PCT Pub. Date: Nov. 30, 2006

(65) Prior Publication Data
US 2009/0274214 A1 Nov. 5, 2009

Related U.S. Application Data

(60) Provisional application No. 60/684,590, filed on May 26, 2005, provisional application No. 60/701,040, filed on Jul. 21, 2005.

(30) Foreign Application Priority Data

Sep. 15, 2005 (KR) .................. 10-2005-0086500

(51) Int. Cl.
*H04N 7/12* (2006.01)
(52) U.S. Cl. .......... 375/240.16; 375/240.12; 375/240.14
(58) Field of Classification Search ............. 375/240.16
See application file for complete search history.

(56) References Cited

U.S. PATENT DOCUMENTS

| 2004/0086041 A1* | 5/2004 | Ye et al. .................. 375/240.08 |
| 2006/0013309 A1* | 1/2006 | Ha et al. .................. 375/240.16 |
| 2007/0201549 A1* | 8/2007 | Hannuksela et al. .... 375/240.01 |

OTHER PUBLICATIONS

JVT-O202, "Joint Scalable, Video Model JSVM-2", Busan, Apr. 16-22, 2005 (with a legible non-patent English document).
Jens-Rainer Ohm, "Advances in Scalable Video Coding". Proceedings of the IEEE, vol. 93, No. 1, Jan. 1, 2005, pp. 42-56 (with a legible non-patent English document).

(Continued)

*Primary Examiner* — Jamie Atala
(74) *Attorney, Agent, or Firm* — Fish & Richardson P.C.

(57) ABSTRACT

Disclosed is a method for providing and using information about inter-layer prediction when providing a video signal to a plurality of layers by encoding the video signal. The method for encoding an image signal to bit streams of an enhanced layer and a base layer, includes the steps of coding an image block in a picture of the enhanced layer into residual data based on image data of a block of the base layer corresponding to the vide block, and providing indication information through the bit stream of the enhanced layer, the indication information representing whether the coding is achieved in inter-layer prediction constraint or inter-layer prediction unconstraint.

5 Claims, 4 Drawing Sheets

OTHER PUBLICATIONS

Yuwen He et al., "Improved Fine Granular Scalable, Coding With Interlayer Prediction", Proceedings of the Data Compression Conference, Apr. 2-4, 2002, pp. 172-181 (with a legible non-patent English document).

International Search Report dated Oct. 18, 2006 for Application No. PCT/KR2006/001980, 1 page.

European Office Action issued in Application No. 06747456, mailed Nov. 24, 2010, 6 pages.

ITO Study Group 16, "Text of ISO/IEC 14496-10:2005 (AVC 3rd edition)," Video Coding Experts Group-ITO/IEC MEPEG & ITU-T VCEG(ISO/IEC JTC1/SC29NVG11 and ITU-T SG16 Q6), No. N7081, Apr. 22, 2005, XP030013753.

TO Study Group 16, "Video Verification Model version 3.0," Video Coding Experts Group-ITO/IEC MEPEG & ITU-T VCEG(ISO/IEC JTC1/SC29NVG11 and ITU-T SG16 Q6), No. N1277, Jul. 15, 2006, XP030010211.

ISO/IEC JTC11SC29NVG11 N6898, "Description of core experiments in SVC," Jan. 1, 2005, XP002340411.

Joint Viedeo Team, "Scalable Video Coding-working Draft 2," JVT of ISO/IEC MPEG & ITU-T VCEG (ISO/IEC JTC1/SC29/WG11 and ITU-T SG16 Q6), Apr. 16, 2005, pp. 1-134,X9002399746.

\* cited by examiner

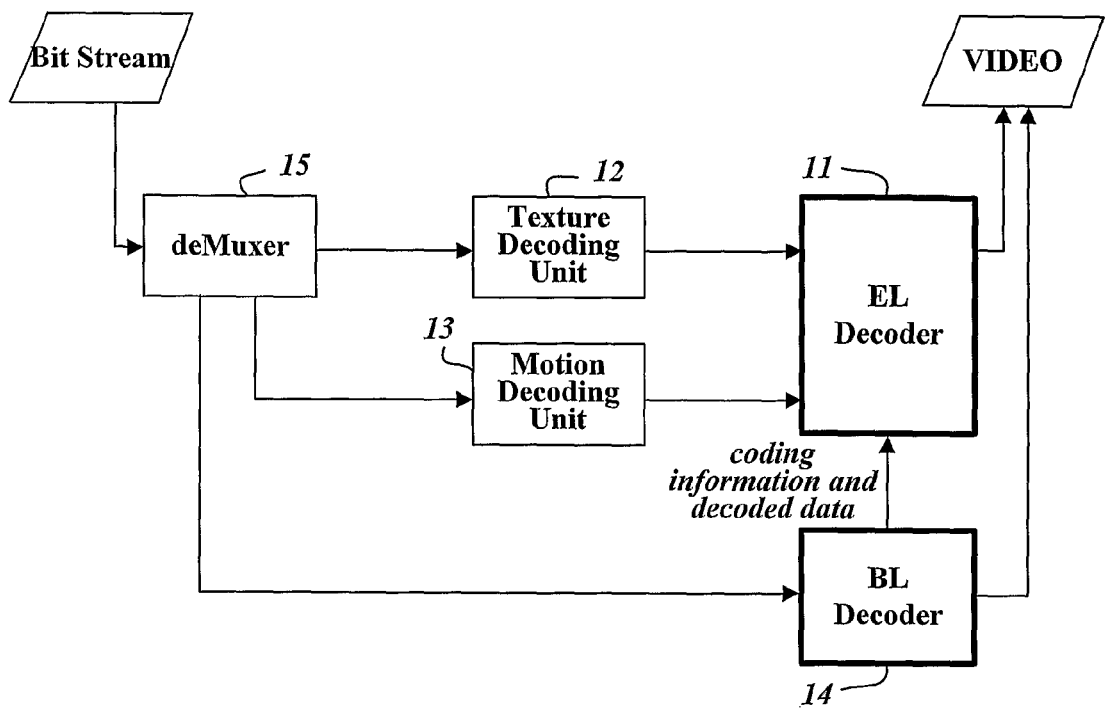

FIG. 4

FIG. 5 interlayer_constrained = 0
if( constrained_intra_pred_flag of Base Layer == 1 )
    interlayer_constrained = constrained_inter_layer_pred_flag

FIG. 6 interlayer_constrained = 0
if( constrained_intra_pred_flag of Base Layer == 1 ) {
    if ( picture type == key picture or L picture )
        interlayer_constrained = constrained_inter_layer_pred_L_flag
    else
        interlayer_constrained = constrained_inter_layer_pred_H_flag
}

METHOD FOR PROVIDING AND USING INFORMATION ABOUT INTER-LAYER PREDICTION FOR VIDEO SIGNAL

CROSS REFERENCE TO RELATED APPLICATIONS

This application, which is a national phase entry of International Application No. PCT/KR2006/001980, filed 25 May 2006, claims priority to and the benefit of United States Provisional Application No. 60/684,590, filed 26 May 2005, United States Provisional Application No. 60/701,040, filed 21 Jul. 2005, and Korean Application No. 10-2005-0086500, filed 15 Sept. 2005.

TECHNICAL FIELD

The present invention relates to a method for providing and using information about inter-layer prediction when providing a video signal to a plurality of layers by encoding the video signal.

BACKGROUND ART

According to a Scalable Video Codec (SVC) scheme, a video signal is encoded with a best video quality in such a manner that a low quality video can be presented even though parts of picture sequences (frame sequences intermittently selected from among the picture sequences) derived from the encoding are decoded. A motion compensated temporal filter (or filtering) (MCTF) is one of encoding schemes suggested for the SVC scheme.

However, although picture sequences encoded through the SVC scheme can present a low quality image even if only parts of received picture sequences are processed, image quality is seriously degraded if a bit rate is lowered. In order to overcome the image quality degradation, an additional assistant picture sequence having a low transmission rate, such as a small-sized video and/or a picture sequence having the smaller number of frames per second, may be provided in a hierarchy structure having at least one layer On the assumption that two sequences are processed, an assistance sequence (a lower layer sequence) and a main picture sequence (an upper layer sequence) are called a base layer and an enhancement layer, respectively. However, since the base layer and the enhanced layer are obtained by encoding the same video source, redundancy information exists in video signals of both layers. Accordingly, in order to improve the coding rate of the enhanced layer, the video signal of the enhanced layer is coded using coding information of the base layer. This is one of inter-layer prediction schemes.

For example, when the type of a current macro block in the enhanced layer is determined as an intra mode macro block, the current macro block is coded into residual data using image data of a corresponding block in an intra mode of the base layer (this corresponding block temporarily simultaneous with and identical to the macro block of the enhanced layer).

The coded macro block is called an 'intra BL mode block', and the specification of the intra BL mode for the macro block may be limited or not. For example, as shown in FIG. 1A, the inter-layer prediction may be constrained by allowing the inter-layer prediction only when the corresponding block of the base layer is coded in the intra mode. In addition, as shown in FIG. 1B, the inter-layer prediction may not be constrained by allowing the inter-layer prediction when the corresponding block of the base layer is coded in an inter mode as well as in an intra mode.

A encoding mode (in the side of an encoder) or a decoding mode (in the side of a decoder) is determined from one of modes shown in FIGS. 1A and 1B based on the value of a 'constrained_intra_pred_flag' of the base layer. When a macro block having residual data coded in an intra mode is reconstructed, this flag is used for indicating that a fixed value (constrained_intra_pred_flg=1) or a reconstructed pixel value (constrained_intra_pred_flg=0)) is employed for the adjacent inter mode block.

However, when a video signal is encoded in three layers as shown in FIG. 2, and when both the upper layer (L1) and the middle layer (L2) are coded by employing the lower layer (L3) as a prediction layer and then are provided to the decoder, both the upper layer (L1) and the middle layer (L2) are constrained in a coding scheme for an intra mode block of the lower layer (L3). In other words, when the constrained_intra_pred_flag of the lower layer (L3) is '1', prediction-constraint is assigned to the upper layer (L1) and the middle layer (L2) so that the upper layer (L1) and the middle layer (L2) are coded through a constrained scheme as shown in FIG. 1A. In addition, when the constrained_intra_pred_flag is '0', prediction-unconstraint is assigned to the upper layer (L1) and the middle layer (L2) so that the upper layer (L1) and the middle layer (L2) are coded through an unconstraint scheme as shown in FIG. 1B. In other words, when inter-layer prediction is performed based on the lower layer (L3), the upper layers of the lower layer cannot individually select the inter-layer prediction constraint or the inter-layer prediction unconstraint.

In addition, since inter-layer prediction constraint (unconstraint) is determined for "constrained_intra_pred_flag" having a different attribute, if the "constrained_intra_pred_flag" of a lower layer has a specific value from among a plurality of layers, the upper layer may loss the degree of freedom for the inter-layer prediction constraint. In other words, only one of inter-layer prediction constraint and inter-layer prediction unconstraint is forcibly determined for the upper layer.

DISCLOSURE OF INVENTION

Accordingly, the present invention has been made to solve the above-mentioned problems occurring in the prior art, and an object of the present invention is to provide a method for transmitting information about inter-layer prediction constraint for a video signal through a prediction coded layer and decoding the video signal using the transmitted information.

To accomplish the above objects, there is provided a method for encoding an image signal to bit streams of a first layer and a second layer, the method comprising the steps of (1) coding an image block in a picture of the first layer into residual data based on image data of a block of the second layer corresponding to the vide block; and (2) providing indication information through the bit stream of the first layer, the indication information representing whether the coding is achieved in inter-layer prediction constraint or inter-layer prediction unconstraint.

According to another aspect of the present invention, there is provided a method for decoding encoded bit streams of a first layer and a second layer by receiving the encoded bit streams, the method comprising the steps of: (1) determining indication information representing that all or a part of data of the first layer are coded in an inter-layer prediction constraint state or in an inter-layer prediction unconstraint state, the indication information being provided through the bit stream of the first layer; and (2) determining whether an inter mode block of the second layer is reconstructed first or not in order to reconstruct a corresponding block having a specific mode in a picture of the first layer.

According to still another aspect of the present invention, there is provided a method for decoding encoded bit streams of a first layer and a second layer by receiving the encoded bit streams, the method comprising the steps of: (1) determining indication information indicating that use of adjacent inter mode block data is constrained when an intra mode block is reconstructed, the flag being included in the bit stream of the second layer; and (2) determining indication information representing that all or a part of data of the first layer are coded in an inter-layer prediction constraint state or in an inter-layer prediction unconstraint state, the indication information being provided through the bit stream of the first layer if the determined indication information of step (1) indicates that the use of the adjacent inter mode block data is constrained.

According to an embodiment of the present invention, the indication information is allocated with different values depending on types of pictures.

According to an embodiment of the present invention, the types of the pictures are classified into two types including a key picture (or a picture having a low band component) and a non-key picture (or a picture having a high band component).

According to an embodiment of the present invention, the indication information is classified according to the types of the pictures and has a value representing that the pictures are coded in an inter-layer prediction constraint/unconstraint.

BRIEF DESCRIPTION OF DRAWINGS

The above and other objects, features and advantages of the present invention will be more apparent from the following detailed description taken in conjunction with the accompanying drawings, in which:

FIG. 4 is a block diagram illustrating the structure of a decoder for decoding a data stream transmitted and encoded by the encoding device shown in FIG. 3;

FIG. 5 is a view illustrating an example of syntax used for determining by a decoder whether or not inter-layer prediction is constrained according to an embodiment of the present invention; and FIG. 6 is a view illustrating an example of syntax used for determining by a decoder whether or not inter-layer prediction is constrained according to another embodiment of the present invention.

MODES FOR CARRYING OUT THE INVENTION

Figure 1A:
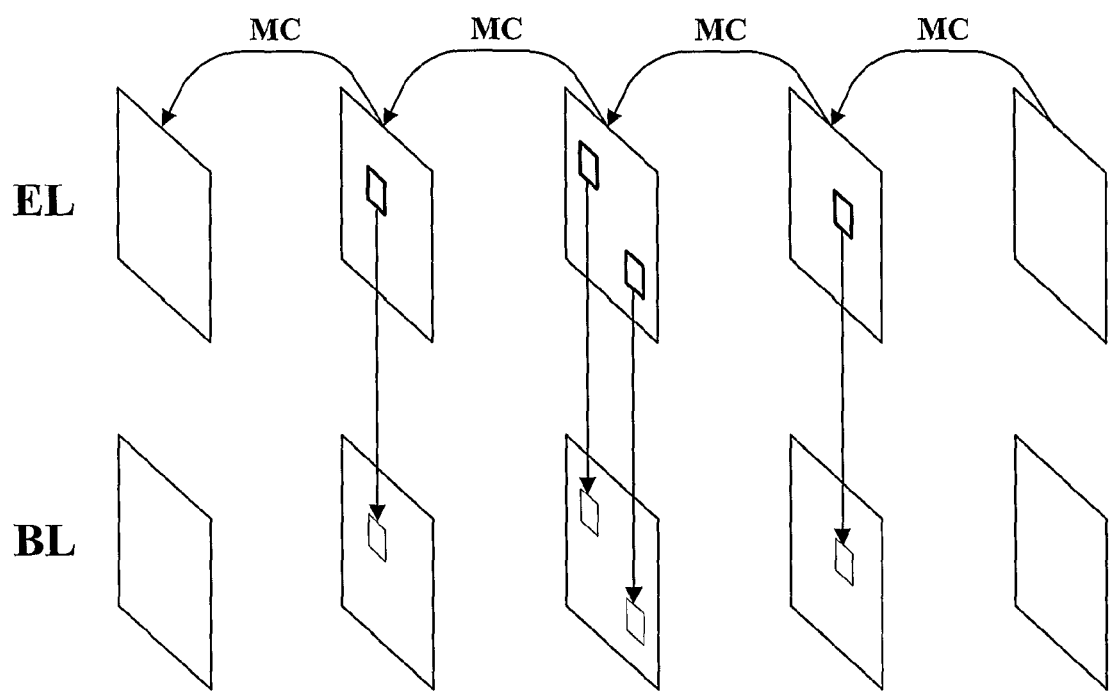
FIG. 1A is a view illustrating a scheme of predicting an intra mode block based on a lower layer according to inter-layer prediction constraint.

Hereinafter, preferred embodiments of the present invention will be described with reference to the accompanying drawings. In the following description and drawings, the same reference numerals are used to designate the same or similar components, and so repetition of the description on the same or similar components will be omitted.

Figure 3:
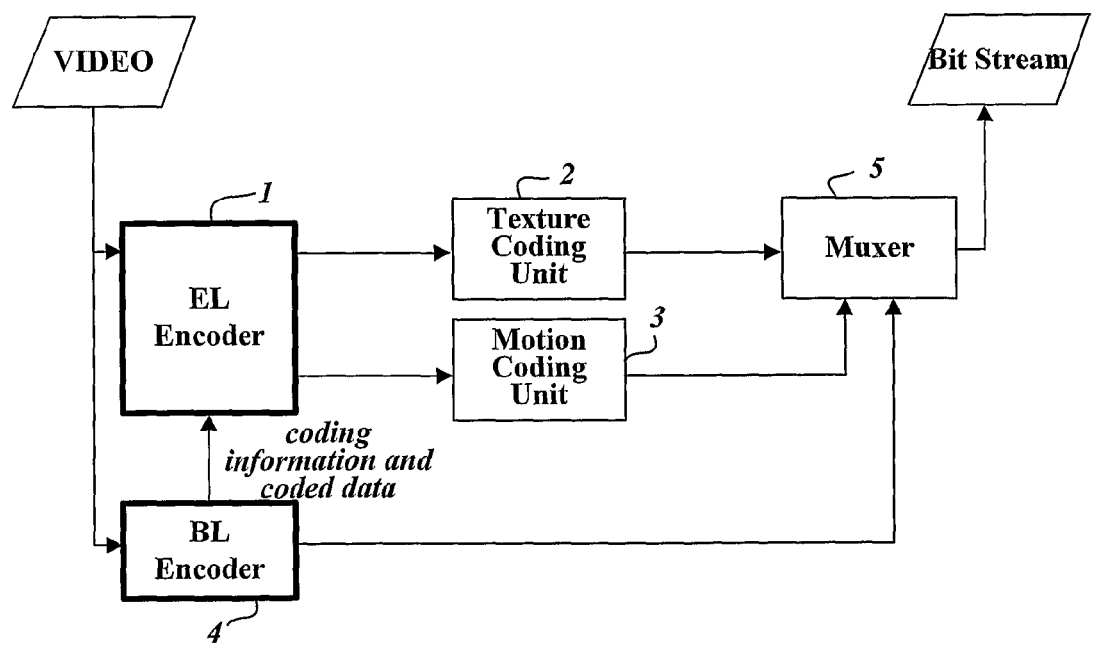
FIG. 3 is a block diagram illustrating the structure of a video signal encoding device employing a scalable coding scheme for a video signal according to the present invention.

FIG. 3 is a block diagram illustrating the structure of a video signal encoding device employing a video signal scalable coding scheme according to the present invention. Although the device shown in FIG. 3 codes an input video signal in two layers, the following principle of the present invention is applicable between layers even if the device codes the input signal in three layers or more.

The video signal encoding device shown in FIG. 3 according to the present invention includes an enhanced layer (EL) encoder 1 for scalably encoding an input video signal through a specification scheme (e.g., MCTF or AVC) based on each macro block unit and generating suitable management information, a texture coding unit 2 for converting the encoded information of each macro block into a compressed bit string, a motion coding unit 3 for coding motion vectors of a video block obtained from the EL encoder 1 into a compressed bit string through a specific scheme, a base layer encoder 4 for encoding an input video signal through a specification scheme such as an AVC scheme and generating the sequence of small-sized videos, for example, the sequence of pictures having 25% of an original video size or the sequence of pictures having the same size as the enhanced layer and a low frame rate, a muxer 5 for encapsulating the output data of the texture coding unit 2, the encoded video sequence of the BL encoder 4, and an output vector data of the motion coding unit 120 in a predetermined format, multiplexing the data with each other in a predetermined format, and then outputting the multiplexed data.

The EL encoder 1 performs a motion estimation operation and a prediction operation with respect to a macro block in a predetermined image frame. In this case, the BL encoder 1 performs an inter-layer prediction coding using video data and coding information provided from the BL encoder 4, inserts coding information according to the inter-layer prediction coding as macro block information into a suitable header, and transmits the coding information if coding efficiency is improved.

In the coding procedure, if a current macro block to be coded is determined as an intra-mode macro block, it is determined that a block corresponding to the current macro block is in an intra-mode or in an inter-mode based on information provided from the BL encoder 4. In the case of the intra-mode, the current macro block is specified as an intra BL mode block and coded into residual data using image data of the corresponding block in the base layer.

In the case of the inter-mode, the current macro block may be specified as an intra BL mode block (in a case of unconstraint) according to an inter-layer prediction constraint/unconstraint state predetermined for encoding, and coded into the residual data using image data of the corresponding block of the base layer as described above. In the case of constraint, the current macro block may be specified as an intra mode block according to the inter-layer prediction constraint/unconstraint state and coded into residual data based on pixel values of an adjacent macro block.

In addition, in the case of constraint, specific information including "constrained_inter_layer_pred_flag" may be set to '1'. If the constraint is not set, the constrained_inter_layer_pred_flag may be set to '0'. The set specific information is inserted into a header (a sequence header, a picture or picture group header, or a slice header) to be transmitted.

In the case of unconstraint, the EL encoder 1 codes an image of the current macro block into residual data and specifies the mode of the image of the current macro block as an intra BL mode based on a reconstructed image obtained by performing a reconstruction operation (MC: Motion Compensation or inverse-MCTF) for an inter mode block of the base layer corresponding to the current macro block. In the reconstruction operation for the inter mode block, the reconstructed image may be received by requesting the image from the BL encoder 4, and, if the BL encoder 4 temporarily stores image data before the current macro block is coded into the residual data, the stored image data may be used.

The EL encoder 1 may insert the constraint flag into one of several headers. If the EL encoder 1 inserts the constraint flag into a picture header (PPS; Picture Parameter Set and PPSE; PPS extension) or a slice header, the EL encoder 1 may specify inter-layer prediction constraint according to slices. In addition, the EL encoder 1 may insert the constraint flag into a header for a sequence or a header for a group of pictures (GOP) In this case, all slices belonging to the sequence or the GOP equally undergo constraint or unconstraint specified by the constraint flag.

Description about encoding procedures for a macro block in several block modes will be omitted because the encoding procedures do not directly relate to the present invention. In addition, generally well-known schemes may be employed for the encoding procedures.

Input image signals are stored in an additional storage unit through encoding procedures including the above-described procedure. Then, all or a part of the image signals are read-out from the storage unit according to the request of a decoder and are transmitted through a transmission channel. The selection for an amount of the image signals is determined according to the capacity of the transmission channel, and description about the selection for the amount of the image signals will be omitted because the selection is regardless of the present invention.

FIG. 4 is a block diagram illustrating the structure of the decoder for decoding a data stream encoded and transmitted as described above. The decoder shown in FIG. 4 includes a de-muxer 15 for dividing the received data stream into a compressed motion vector stream and a compressed macro block information stream, a texture decoding unit 12 for recovering an original uncompressed information stream from the compressed macro block stream, a motion decoding unit 13 for recovering an original uncompressed stream from a compressed motion vector stream, an enhanced layer (EL) decoder 11 for converting the uncompressed macro block information stream and the motion vector stream into an original video signal through an MCTF scheme, and a base layer (BL) decoder 14 for decoding base layer stream through a predetermined scheme such as an AVC scheme.

The BL decoder 14 provides header information included in an input base layer stream to the EL decoder 11 while decoding the input base layer stream such that the EL decoder 11 can use required encoding information (in the header of the base layer stream) of the base layer including motion vector information and macro block mode information. In addition, the BL decoder 14 provides image data of the decoded base layer picture or a picture, in which a part of blocks is decoded, to the EL decoder 11 according to the direction of the EL decoder 11.

The EL decoder 11 determines the constrained_inter_layer_pred_flag, which is an inter-layer prediction constraint flag, in a header of a GOP or a sequence having a picture to be currently decoded among received picture sequences of the enhanced layer. As described through the above encoding procedure, the inter-layer prediction constraint flag may be checked in the picture header or the slice header.

If the inter-layer prediction constraint flag applied to a slice to be decoded has been set as "inter-layer prediction constraint" (constrained_inter_layer_pred_flag=1), in the case of inter BL mode blocks in the slice, at least for intra mode blocks, the EL decoder 11 receives decoded picture data provided by the BL decoder 14 (or reads the decoded picture data from a memory shared between the EL decoder 11 and the BL decoder 14) and reconstructs original image data from residual data of the intra BL mode block based on reconstructed data of blocks in the decoded picture data corresponding to the intra BL mode blocks.

If the determined inter-layer prediction constraint flag applied to the slice to be decoded is specified as inter-layer prediction unconstraint (constrained_inter_layer_pred_flag=0), the EL decoder 11 directs the BL decoder 14 to reconstruct all macro blocks in a slice of the base layer corresponding to the slice to be decoded and provide the reconstructed macro blocks to the EL decoder 11. If the BL decoder 14 is set in such a manner that the BL decoder 14 always provides decoded data for all pictures, it is unnecessary for the EL decoder 11 to request the direction according to conditions. However, since residual prediction is used between layers in addition to inter-layer prediction based on an intra BL mode, it is preferred that the BL decoder 14 reconstructs only intra mode block data instead of all data within a picture so as to provide the reconstructed data to the EL decoder 11 and, if there is additional direction, performs a reconstruction operation (the MC or the inverse_MCTF) for inter mode blocks within the picture so as to provide a slice having the reconstructed image data.

The EL decoder 11 reconstructs original image data from residual data of a current intra BL mode block based on reconstructed data of a block corresponding to the BL mode block in a slice having reconstructed data received from the BL decoder 14.

According to another embodiment of the present invention, information about inter-layer prediction constraint may be classified and set according to types of pictures.

If a type of a picture is a key picture or a picture coded using a picture having a low band component (an L picture in the case of the MCTF), the EL encoder 1 shown in FIG. 3 may set or reset flag information about "constrained_inter_layer_pred_L_flag", thereby transmitting the flag information to the decoder. If the type of the picture is a non-key picture or a picture coded using a high band component (an H picture in the case of the MCTF), the EL encoder 1 shown in FIG. 3 may set or reset flag information about "constrained_inter_layer_pred_H_flag", thereby transmitting the flag information to the decoder.

The key picture denotes a picture coded into residual data by performing a prediction operation based on only a quality-base picture. In contrast, the non-key picture denotes a picture coded into residual data based on SNR enhance picture data in addition to the quality-base picture. The definition of the key picture is only one example, and the present invention is limited to the definition.

Although the two inter-layer prediction constrained flags (constrained_inter_layer_pred_L _flag and (constrained_inter_layer_pred_H_flag) are applied to different types of pictures, the two flags have the same usage as the constrained_inter_layer_pred_flag. Accordingly, the EL decoder 11 shown in FIG. 4 determines the value of the constrained_inter_layer_pred_L_flag if a picture to be decoded is the key picture or the picture having a low band component. If the picture to be decoded is the non-key picture or the picture having a high band component, the EL decoder 11 determines the value of the constrained_inter_layer_pred_H_flag. The reconstruction operation of a BL mode macro block according to the determined value is identical to that of the previous embodiment of the present invention.

Hereinafter, another embodiment of the present invention will be described.

When the constrained_intra_pred_flag, which indicates whether or not data in an adjacent inter mode block are used in the reconstruction of an intra mode block, is reset in the base layer, that is, when the constraint is not set, the BL decoder 14 shown in FIG. 4 performs a reconstruction operation through an MC scheme (an inverse-MCTF scheme) with respect to the adjacent inter mode block in order to reconstruct residual data in the intra mode block of the picture. In this case, it is advantageous that the EL encoder 1 shown in FIG. 1 encodes a macro block to be encoded of the enhanced layer without distinguishing if a block of the base layer corresponding to the macro block is in an inter mode or an intra mode. Because, the EL decoder 11 shown in FIG. 4 can obtain reconstructed image data from the BL decoder 14 through the operation such as the MC even for the inter mode block.

Figure 1B:
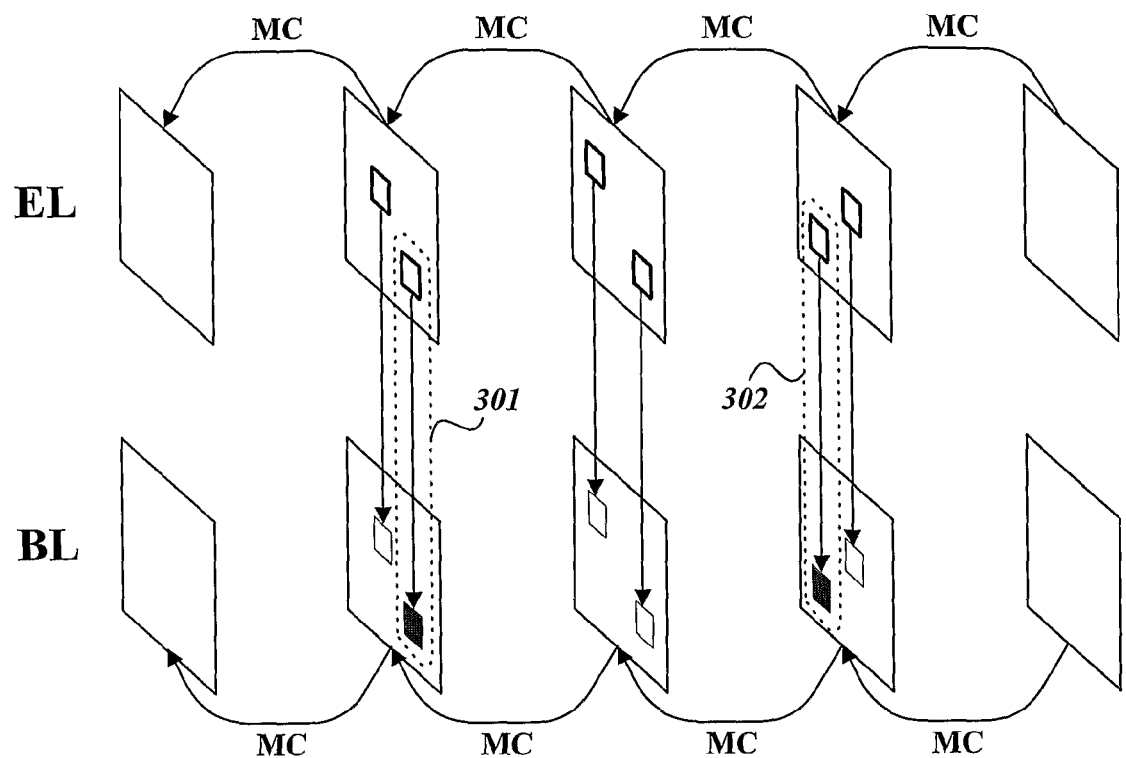
FIG. 1B is a view illustrating a scheme of predicting an intra mode block based on a lower layer according to inter-layer prediction unconstraint.
Figure 2:
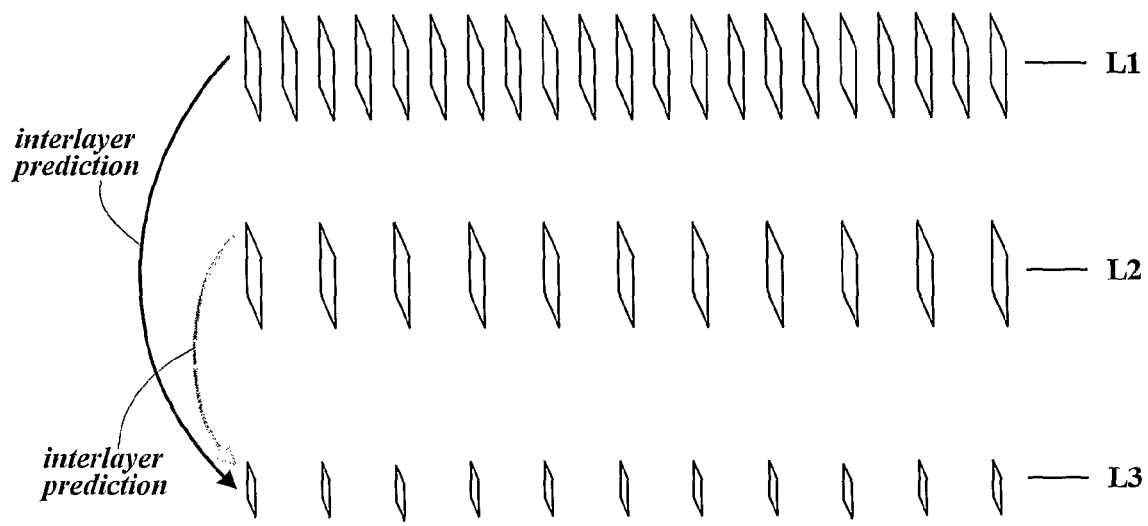
FIG. 2 is a view illustrating an example of an inter-layer prediction scheme of upper layers when a video signal is encoded and transmitted through a plurality of layers including at least three layers.

Accordingly, when the constrained_intra_pred_flag of the base layer is set to '0' by the BL encoder 4 (that is, in a case in which constraint is not set with respect to the adjacent block), the EL encoder 1 shown in FIG. 1 transmits the constrained_inter_layer_pred_flag by resetting the constrained_inter_layer_pred_flag or does not transmit the constrained_inter_layer_pred_flag for a slice or a picture (a sequence or a group including the slice or the picture) including a macro block coded in an intra BL mode.

Since constraint may be set or not for inter-layer prediction when the constrained_intra_pred_flag of the base layer is set to '1' (that is, data of the adjacent inter mode block are not used in the coding (or reconstruction) of the intra mode block due to the constraint set on the adjacent inter mode block), the EL encoder 1 codes a specific block to an intra BL mode block according to a predetermined prediction constraint condition for the enhanced layer and transmits the specific block by setting the constrained_inter_layer_pred_flag to '0' or '1'. If constraint is not set for inter-layer prediction in the case of the constrained_intra_layer_pred_flag set to '1', the EL decoder 11 requests a reconstruction operation for the inter mode block from the BL decoder 14 as described above according to the previous embodiment. Accordingly, in this case, the MC operation (or the inverse-MCTF) for data reconstruction must be performed in both layers.

In the meantime, as described above, according to the present invention, the EL decoder 11 shown in FIG. 4 determines whether or not constraint is set for inter-layer prediction through a scheme shown in FIG. 5 because the constrained_inter_layer_pred_flag may not be transmitted from the encoder.

The EL decoder 11 initializes "interlayer_constrained" which is a variable for inter-layer prediction, as a unconstraint state value (i.e., '0') and then determines the value of the constrained_intra_pred_flag transmitted from the BL decoder 14.

The EL decoder copies the value of the constrained_inter_layer_pred_flag received through a header of the enhanced layer to the value of the interlayer_constrained only if the value of the constrained_intra_pred_flag has '1'.

The EL decoder 11 shown in FIG. 4 can recognize based on the value of the interlayer_constrained if constraint is set for inter-layer prediction. A procedure of reconstructing original image data from residual data of an intra BL mode macro block according to the state of the inter-layer prediction is identical to the procedure described according to the previous embodiment.

In the meantime, it is selected whether or not constraint is set for inter-layer prediction according to the value of the constrained_intra_pred_flag of the base layer, and information (constrained_inter_layer_pred_flag) indicating the selected constraint state may be classified and allocated according to types of pictures. For example, the value relating to inter-layer prediction constraint may be carried through the constrained_inter_layer_pred_L_flag which corresponds to a key picture or a picture coded using a low band component or the constrained_inter_layer_pred_H_flag which corresponds to a non-key picture or a picture coded using a high band component.

Although flag information classified according to types of pictures as described above is used, both the flags may not be transmitted according to the value of the constrained_intra_pred_flag of the base layer or may be transmitted with the value of '0' or '1' as described above. In addition, even the EL decoder 11 shown in FIG. 4 reconstructs an intra BL mode macro block according to the transmission state. If the constrained_intra_pred_flag of the base layer has the value of '0', and if the constrained_inter_layer_pred_L_flag, or the constrained_inter_layer_pred_H_flag is not transmitted, the EL decoder 11 shown in FIG. 4 performs an operation according to a syntax shown in FIG. 6 and determines whether or not the constraint is set for inter-layer prediction according to the final value of the interlayer_constrained obtained through the operation.

Hereinafter, still another embodiment of the present invention will be described.

Information about inter-layer prediction constraint may be delivered using one integrated indicator such as "constrained_inter_layer_pred_idc" without classification and allocation according to types of pictures as described according to the previous embodiment.

According to the present embodiment, the constrained_inter_layer_pred_idc is set to '0' when representing the constraint inter-layer prediction regardless of the types of pictures. In addition, the constrained_inter_layer_pred_idc is set to '1' when representing an inter-layer prediction unconstraint state for a first picture type (e.g., a key picture or a picture having a low band component), and an inter-layer prediction constraint state for a second picture type (e.g., a non-key picture or a picture having a high band component). The constrained_inter_layer_pred_idc is set to '2' when representing the inter-layer prediction unconstraint state regardless of the types of pictures. The EL decoder 11 shown in FIG. 4 determines whether or not constraint is set for the inter-layer prediction according to types of pictures based on the indication information depending on the indication value defined above.

According to the present embodiment, since there is rarely a procedure of encoding the first picture type in the inter-layer prediction constraint state and the second picture type in the inter-layer prediction unconstraint state (actually, when the second type picture is encoded in the inter-layer prediction unconstraint state, it is unnecessary to encode the first type picture in the inter-layer prediction constraint state), the value indicating the case is excluded. However, it is natural that it is possible to represent the case by allocating the value of constrained_inter_layer_pred_idc with an additional value such as '4' if necessity.

As described above, a decoder of determining information representing inter-layer prediction constraint and performing a reconstruction operation for a corresponding BL mode macro block according to the determination result (the reconstruction operation includes an operation of selectively reconstructing an inter mode block of a base layer based on the information representing the inter-layer prediction constraint) may be installed at a mobile communication terminal or a device of reproducing recorded media.

As described above, according to the present invention, the inter-layer prediction constraint/unconstraint state is directly delivered through a prediction-coded layer instead of a base layer for the inter-layer prediction, thereby individually setting or releasing prediction constraint of each layer when a video signal is encoded and transmitted based on a plurality of layers. Accordingly, coding can be freely performed, and layer coding suitable for an encoding environment can be achieved.

Although preferred embodiments of the present invention have been described for illustrative purposes, those skilled in the art will appreciate that various modifications, additions and substitutions are possible, without departing from the scope and spirit of the invention as disclosed in the accompanying claims.

The invention claimed is:

1. A method of decoding a video signal, comprising:
   obtaining inter-layer prediction constrained flag information used for determining whether image information of a corresponding block in a base layer is used for inter-layer prediction;
   obtaining the image information of the corresponding block based on the inter-layer prediction constrained flag information; and
   decoding a current block based on the image information and residual information,
   wherein the residual information is difference value information between the current block in an enhanced layer and the corresponding block in the base layer, and the corresponding block is coded by an intra mode.

2. The method of claim 1, wherein the inter-layer prediction constrained flag information is included in one of a slice header, a picture header, a sequence header, and a picture group header.

3. The method of claim 1, wherein the video signal is received as a broadcast signal.

4. The method of claim 1, wherein the video signal is received on a digital medium.

5. An apparatus for decoding a video signal, comprising:
   an enhanced layer decoder obtaining inter-layer prediction constrained flag information used for determining whether image information of a corresponding block in a base layer is used for inter-layer prediction;
   the enhanced layer decoder obtaining the image information of the corresponding block based on the inter-layer prediction constrained flag information; and
   an enhanced layer decoder decoding the current block based on the image information and residual information,
   wherein the residual information is difference value information between the current block in an enhanced layer and the corresponding block in the base layer, and the corresponding block is coded by an intra mode.

* * * * *